Figure 1:
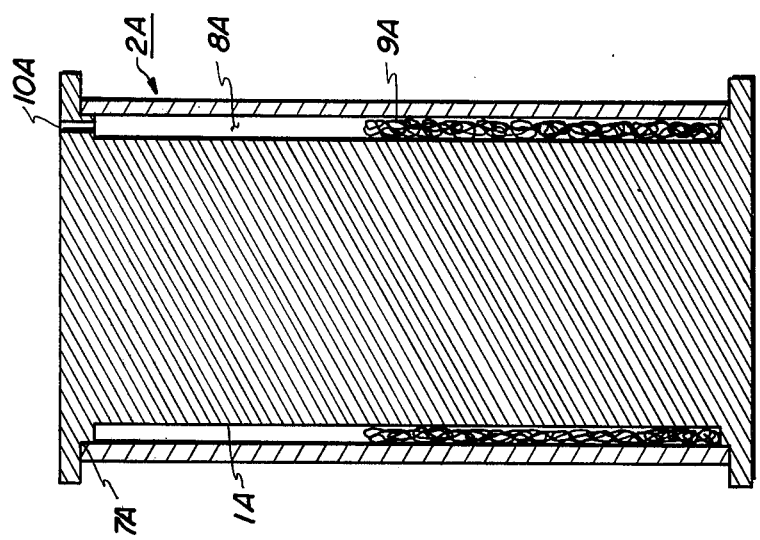

_United States Patent_ [19]

McGibbon

[11] 4,023,967
[45] May 17, 1977

[54] ELECTROPHOTOGRAPHIC LIQUID DEVELOPMENT METHOD IN WHICH A UNIFORM SUBSTANTIAL INTERFACE CONTACT IS MAINTAINED

[75] Inventor: Graeme McGibbon, Knebworth, England

[73] Assignee: Xerox Corporation, Stamford, Conn.

[22] Filed: Apr. 25, 1974

[21] Appl. No.: 464,258

[30] Foreign Application Priority Data

Sept. 7, 1973 United Kingdom ............ 42185/73

[52] U.S. Cl. .................................. 96/1 LY; 29/130; 29/132; 96/1.5; 118/244; 118/661; 118/DIG. 14; 118/DIG. 15; 355/10
[51] Int. Cl.² ................. G03G 13/10; G03G 15/10; G03G 5/00
[58] Field of Search ........................... 96/1 LY, 1.5; 117/37 LE; 118/637, 244, DIG. 14, DIG. 15; 427/17, 15; 29/110, 130, 132; 355/10

[56] References Cited

UNITED STATES PATENTS

| | | | |
|---|---|---|---|
| 2,741,014 | 4/1956 | Hubbard | 29/130 |
| 2,926,628 | 3/1960 | Black et al. | 29/130 X |
| 3,084,043 | 4/1963 | Gundlach | 96/1 LY |
| 3,096,198 | 7/1963 | Schaffert | 355/10 X |
| 3,102,045 | 8/1963 | Metcalfe et al. | 117/37 LE |
| 3,368,526 | 2/1968 | Matsumoto et al. | 427/15 X |
| 3,384,051 | 5/1968 | Hunstiger | 427/15 X |
| 3,435,500 | 4/1969 | Aser et al. | 29/132 X |
| 3,467,009 | 9/1969 | Ross | 29/130 |
| 3,498,596 | 3/1970 | Moser | 219/388 W X |
| 3,592,134 | 7/1971 | Patterson | 29/130 X |
| 3,627,557 | 12/1971 | Sato et al. | 427/17 |
| 3,646,652 | 3/1972 | Heiligenthal et al. | 29/130 |
| 3,662,446 | 5/1972 | Walls | 29/130 |
| 3,693,544 | 9/1972 | Irzyna | 29/130 X |
| 3,750,246 | 8/1973 | Pessen | 29/130 |
| 3,753,706 | 8/1973 | Sankus et al. | 117/37 LE X |
| 3,776,723 | 12/1973 | Royka et al. | 96/1 LY |
| 3,806,354 | 4/1974 | Amidon et al. | 117/37 LE |
| 3,936,170 | 2/1976 | Shibano et al. | 96/1 TE |

FOREIGN PATENTS OR APPLICATIONS

| | | | |
|---|---|---|---|
| 718,846 | 9/1965 | Canada | 118/DIG. 15 |
| 1,162,162 | 1/1964 | Germany | 118/DIG. 15 |
| 1,052,069 | 12/1966 | United Kingdom | |

_Primary Examiner_—Edward C. Kimlin
_Assistant Examiner_—John R. Miller
_Attorney, Agent, or Firm_—James J. Ralabate; James P. O'Sullivan; John E. Crowe

[57] ABSTRACT

A roller device and method for maintaining a uniform surface contact along a line of axial trangency with respect to one or more rigid cooperating surfaces having irregularities, the roller device comprising a rigid solid- or cylindrical-type core loosely circumscribed axially with a flexible sleeve, the space between the core and the sleeve being substantially equidistant and filled with a curable plastic foam material to obtain a uniform contact and nip width when in rotational contact with a cooperating surface.

8 Claims, 3 Drawing Figures

ELECTROPHOTOGRAPHIC LIQUID DEVELOPMENT METHOD IN WHICH A UNIFORM SUBSTANTIAL INTERFACE CONTACT IS MAINTAINED

The present invention relates generally to a roller device having a resilient surface and to a method for obtaining and utilizing such a roller. The resilient surface of the roller device allows it to maintain substantial contact along the length of its axial tangency, with a more rigid surface with which it cooperates.

THE PRIOR ART

Generally speaking, when a charged photoreceptor surface is light- or radiation-struck, it is selectively discharged at a higher than average rate, leaving a latent image charge pattern on the photoreceptor surface corresponding to the positive image. This latent image is then developed with a xerographic toner.

U.S. Pat. No. 3,084,043 relates to an apparatus and to a method for liquid development of an electrostatic latent image wherein liquid developer is presented to a photoreceptor having an electrostatic latent image on its surface. The presentation is effected by means of an applicator surface comprising lands and valleys such that the liquid developer is contained in the valleys and out of contact with uncharged parts of the photoreceptor even when the surfaces of the lands are in physical contact with the photoreceptor. In such an arrangement, liquid developer is attracted from the valleys to an electrostatic latent image in image configuration.

Typically, the developed image is then transferred to an image receiving member, such as paper, by pressure contact between the photoreceptor and a roller.

Although both of the photoreceptor and the applicator surfaces, as above described, can be flat, it is more common for at least one of the surfaces to be arcuate to facilitate the moving of the applicator past sequential points on the photoreceptor while the two are in contact. In compact electrostatographic copying devices, the above surfaces are typically small diameter cylinders to facilitate the cooperative movement of the surfaces in a confined space. Such movement typically occurs at speeds of about 4 inches per second, although moving contact resulting in the transfer of liquid developer from the applicator to the photoreceptor occurs at speeds ranging generally from about 2 to about 70 inches per second.

Although visible and recognizable images can be produced by the above apparatus and method, they have been found to lack uniform density and to be characterized by spots and streaks where no image is developed. Typically, areas of an image which have the same shade of color or density in the original have areas of greatly varying density in the developed image and final copy. Further, the final copy typically has areas of streaks and spots where no image was developed to correspond to solid areas of the original image. Such characteristics in the developed image are generally considered unsatisfactory, not pleasing to the eye, and as indices of unacceptable copy quality.

At least some of the above-listed problems can be attributed to slight surface deformities or discontinuities on one or both of the applicator surfaces or the latent image-bearing photoreceptor surface. Such imperfections are particularly troublesome when one or both surfaces are of relatively rigid and sufficiently irregular construction such that the distance between the liquid toner level in the valleys and the photoreceptor surface can not be uniformly maintained during development.

It is found, however, that a substantially uniform contact and nip width between photoreceptor and liquid toner applicator surfaces can be achieved where the gap distance between adjacent portions of the surfaces, while maintained in contact, is less than about 0.0005 inch along the line of tangency between the surfaces. It is possible, for instance, for a rigid applicator surface having an overall variation along its line of tangency with the photoreceptor of not more than about 0.002 inch and a variation from land to land of not more than about 0.0005 inch to maintain contact. Here a deformable photoreceptor is utilized having a hardness of about 30° (Shore A durometer) and the gap between the deformable photoreceptor surface and the lands of the rigid applicator surface is maintained at about 0.0005 inch or less.

While the photoreceptor can be the deformable member, it is to be understood that the applicator can also be the deformable member. In any case, the deformable member can have a hardness of up to about 90° (as measured on a Shore A durometer). For producing copies of consistent sharpness and clarity, the preferred hardness ranges from about 40° to about 70°, the optimum print quality is achieved with about 50° to about 60° (Shore A).

In utilizing the above information, it is important to keep in mind that the deformable surface must maintain its functional integrity during any deformation. That is, the deformable member, whether an applicator or photoreceptor, must continue to provide its intended liquid xerographic developmental function during deformation.

Included within this parameter, for instance, is the requirement that the respective surfaces move in operative contact for substantially uniform periods of time so that the liquid developer is able to migrate from the applicator valleys up to the latent image on the photoreceptor surface. This should involve a substantially uniform gap never in excess of 0.0005 inch.

Unfortunately, it is very difficult to limit contact along the desired line of tangency while still providing the degree of softness and resiliency required.

It is an object of the present invention to obtain improved copy quality in the liquid xerographic mode.

It is a further object to develop a more efficient photoreceptor and toner applicator means for use with liquid developer compositions in the xerographic mode by providing proper physical characteristics within the scope of the above parameters.

THE INVENTION

The above objects are obtained in accordance with the present invention by a roller device such as a photoreceptor surface and/or liquid toner applicator surface having at least one arcuate surface for maintaining uniform surface contact along the length of its axial tangency with respect to a more rigid cooperating surface, wherein the device comprises:
 a. a rigid core and end supporting means;
 b. a flexible sleeve mounted over the core component of the core and end supporting means and spaced apart from the circumference of the core; and
 c. a foam filler layer positioned in supporting contact between the core and the flexible sleeve to maintain a resilient, substantially equidistant relationship between the sleeve and the core.

According to a preferred embodiment of the present invention, there is provided a roller having a uniform surface resiliency sufficient to maintain substantial contact along a line of axial tangency with a cooperating surface, said roller comprising a rigid central core, a flexible sleeve uniformly spaced apart from the circumference of the rigid central core and a semi-rigid foam positioned between the rigid central core and the flexible sleeve.

In addition, the present invention relates to a method for effecting and maintaining a uniform substantial interface contact between a xerographic liquid toner applicator roll and a cooperating latent image-bearing surface. For such purpose, one surface can be rigid and contain irregularities and the other can be a non-rigid member comprising a rigid core and end supporting means and a flexible sleeve as described above. Preferably, the flexible sleeve is part of the non-rigid member and has a substantially greater circumference than the core and is spaced substantially uniformly apart from the core by attachment to end supporting means. The relationship is maintained by introducing a low temperature curing monomer-containing foam material intermediate the core and the sleeve and effecting at least a partial cold curing of the foam material to maintain a spaced relationship between the core and the sleeve.

According to still another aspect of the invention, there is provided a method of making a roller having a uniform surface resiliency sufficient to maintain substantial contact along a line of axial tangency with a cooperating surface, said method comprising the steps of:

a. placing a flexible sleeve around a rigid central core so that the flexible sleeve is uniformly spaced apart from the rigid central core;

b. generating in situ a cold-curing foam in the space between the rigid central core and the flexible sleeve; and c. allowing the foam to cure to a semi-hard state.

Photoreceptor members and application rolls in the foam of resilient rollers formed in accordance with the teaching of the present invention provide for the development of electrostatic latent images of similar or equal potential by the application or deposition of substantially equal amounts of developer for respective image potentials. Preferably, the nip width in cooperating use is not more than about 10 fold; the resilient roller has a linear variation along its line of tangency of not more than 0.002 inches and a variation from land to land of not more than 0.0005 inches, and its surface hardness is in the range 40° to 70°, and optimumly about 55°.

Figure 2:
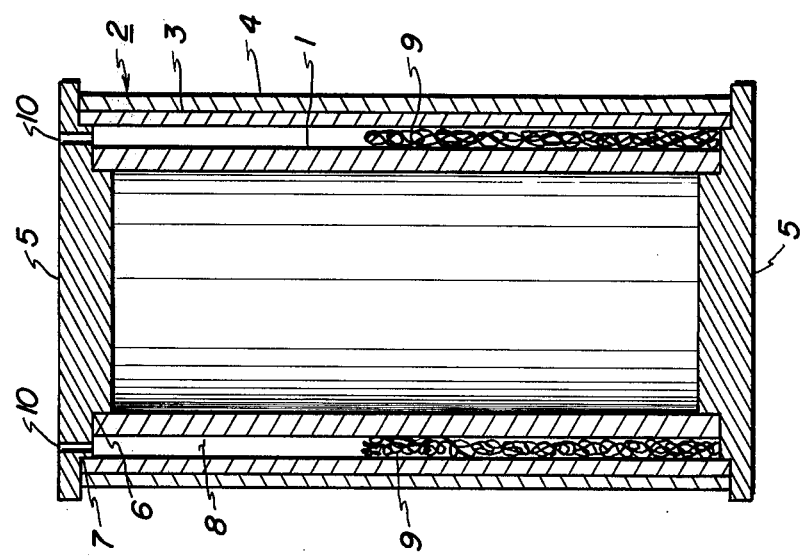
Figure 3:
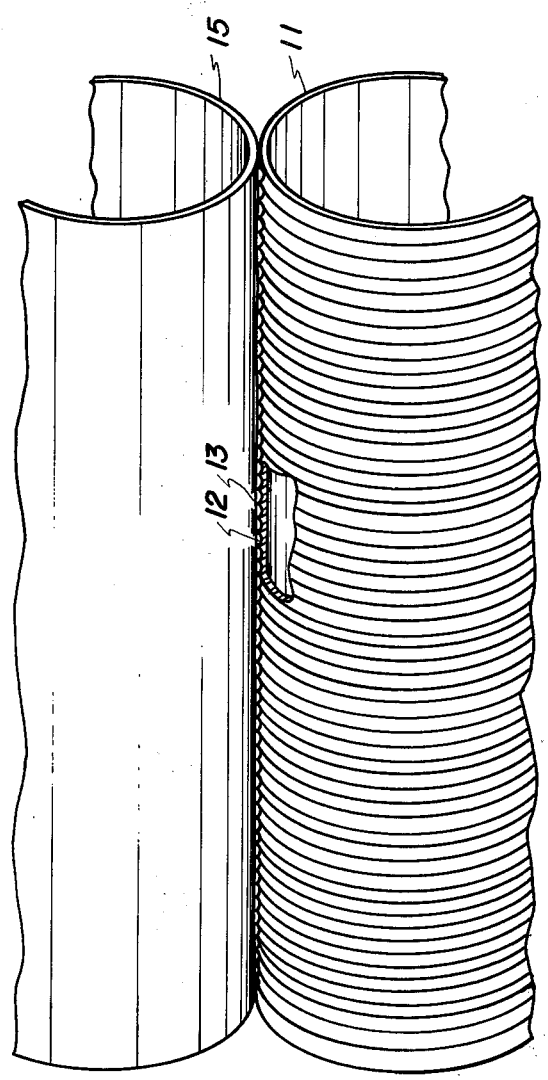

Embodiments of the invention will now be described by way of example with reference to the accompanying drawings in which:

FIG. 1 shows a sectional view of a resilient roller;
FIG. 2 shows a sectional view of an alternative form of the resilient roller; and
FIG. 3 shows schematically a resilient photoreceptor roller cooperating with a rigid applicator roll.

Referring now to the drawings, in FIG. 1 there is shown a rigid core 1 which comprises in this embodiment a central aluminum tube or core. Any material suitable for forming a rigid roller may be used, such as aluminum, steel, including stainless steel, copper, brass, wood, hard rubber and hard synthetic plastics, such as glass fiber reinforced -epoxy, -polyolefin or -polyester resins. The rigid central core may be a solid roller or a tube so long as longitudinal rigidity is maintained.

Also shown in FIG. 1 is a sleeve 2 which is comprised of a material having a thickness which allows it to be flexible. Flexible sleeve 2 of FIG. 1 can be a photoreceptor comprising an extruded brass substrate 3 coated in charge blocking contact with selenium 4 or other known photoconductive material.

The photoreceptor may comprise any suitable photoconductive material coated on any suitable conductive metal base. Typical photoconductors are selenium, selenium alloys and a halogen doped selenium. Substrates such as nickel, brass and aluminum are particularly useful for such purpose. There also may be an interface layer (not shown) between the photoconductive material and the substrate 3 to provide selected adhesive or charge blocking electrical properties and there may be an insulating overcoating layer (not shown) over the photoreceptor. Flexible sleeve 2 has an inside diameter which is sufficiently larger than the outside diameter of the rigid core 1 such that the flexible sleeve will slip over the rigid core leaving a free space 8 between all points on the inside diameter of the flexible sleeve and the outside diameter of the rigid core.

In FIG. 1, the flexible sleeve 2 is spaced part from the rigid core 1 by end supporting plates 5. The end supporting plates are arranged so that they will connect with the rigid central core at groove 6 and with the flexible sleeve 2 at groove 7 such that the sleeve and the core are separated by space 8. The distance between the inside diameter of flexible sleeve 2 and the outside diameter of the rigid central core 1 is equal at substantially all points along the axis and at substantially all points around the circumference of the central core.

In addition to groove 7 of FIG. 1, the flexible sleeve 2 can be spaced apart from the rigid central core by other optional means such as machined flanges (not shown) formed at both ends of the rigid core 1 or one or more overflow parts 10, in such case, being drilled through the overhang area of the flanges. In FIG. 1, the space 8 between the flexible sleeve 2 and the rigid central core 1 is shown only partly filled with foam material 9 although the space is normally filled prior to use. This layer is conveniently applied, for instance, by placing blowing or foaming agents in the space 8 through parts 10 and allowing the foaming agents to react so that a foam 9 is produced, filling space 8 prior to curing. Overflow port 10 is also provided in the embodiment depicted in FIG. 1 to permit any excess foam generated by the foaming agents to vent or overflow. Any suitable cold-curing, semi-hard foam may be used to fill space 8, including polyesters and polyester based polyurethanes, silicone rubbers and room temperature vulcanizing rubbers.

Although not illustrated above, it should be understood that flexible sleeve 2 can be a resilient developer applicator means in cooperation with a separate rigid photoreceptor surface, as well as being a photoreceptor.

Referring now to FIG. 2, there is depicted an alternate embodiment of a resilient roller showing a rigid central core 1A made of steel or other suitable material and having a solid configuration. Flexible sleeve 2A is spaced apart from the central portion of the rigid central core by an extended end portion of core 1A having grooves 7A for supporting the flexible sleeve 2A at a uniform distance from the circumference of core 1A.

Flexible sleeve 2A, as exemplified in FIG. 2, is an applicator means for use in liquid development of electrostatic latent images, said means comprising a pattern of lands and valleys (not shown) extending parallel to the axis of core 1A on the functional surface of the sleeve. Applicator means may be made from any suitable flexible material having the ability to maintain a land and valley surface configuration during flexing. Typical such materials are plastics and metal foils.

The surface of the flexible roller of FIG. 2 is supported by placing foaming agents and uncured polymeric and/or monomeric material in space 8A between flexible sleeve 2A and rigid core 1A, and allowing said material to foam, completely filling space 8A with uncured foam 9A. Excess foam is allowed to escape through at least one overflow port 10A which is formed as an extension of the passage-way between the core 1A and the sleeve 2A.

Referring now to FIG. 3, there is shown, without end supporting means, a resilient photoreceptor roller 15 in cooperation with liquid developer applicator roll 11 having a pattern of grooves 12 and ridges 13 on its operative surface. These act, respectively, as valleys and lands. A liquid developer solution (not shown) is usefully carried and maintained in the valleys so that, upon cooperative motion of the two rollers, the liquid developer solution is electrostatically attracted to those parts of the photoreceptor 15 having an electrostatic latent image. The line of axial contact between the resilient roller 15 and the lands 13 of rigid applicator roller 11 can be uneven. However, the resilient properties of roller 15 permit a continuous contact between its surface and the uneven lands 13 of applicator roller 11 without sufficient distortion of the photoreceptor surface to adversely affect its operation.

It is to be understood that in referring to FIG. 3 the applicator roller 11 may alternatively be the resilient roller, and the photoreceptor surface may be rigid and uneven. In such a configuration, the resilient surface of the applicator roll again would flex to maintain a contact between its lands and the uneven surface of the photoreceptor.

While the above Examples are directed to preferred embodiments of the invention, it will be understood that the invention is not limited whereby.

What is claimed is:
1. A method for effecting and maintaining a uniform substantial interface contact for liquid xerographic development between a xerographic liquid toner applicator roll and a cooperating electrostatic latent image-bearing surface, one of which is rigid and contains surface irregularities, and the other a non-rigid member comprising:
   a. a rigid core and end-supporting means; and
   b. a flexible sleeve mounted over the core component of the core and end-supporting means, said sleeve maintaining functional integrity as a photoreceptor or liquid developer applicator having a pattern of lands and valleys, and in contact with the interfacing member; comprising effecting liquid development of the latent electrostatic image by developmental contact, with a latent electrostatic image, utilizing as part of the non-rigid member a flexible sleeve with a substantially greater circumference than the core component and spaced substantially uniformly apart from the core component by attachment to end supporting means and by particularly cured low temperature curing monomer-containing foam material intermediate the core and the sleeve to maintain a spaced relationship between the core component and the flexible sleeve.

2. The method of claim 1 wherein the flexible sleeve maintains functional integrity as a photoreceptor and comprises a charge conductive material coated on its outer surface with a photoconductive material in charge blocking contact.

3. The method of claim 2 wherein the charge conductive material comprises aluminum and the photoconductive material comprises a selenium alloy.

4. The method of claim 2 wherein the charge conductive material comprises nickel and the photoconductive material comprises a selenium alloy.

5. The method of claim 2 wherein the charge conductive material comprises brass and the photoconductive material comprises a selenium alloy.

6. The method of claim 1, wherein the flexible sleeve maintains functional integrity as a liquid developer applicator and comprises a flexible metal having a land and valley pattern on its surface.

7. The method of claim 1 wherein the foam material is polyurethane.

8. The method of claim 1 wherein the foam material is cold cured in situ.

* * * * *